United States Patent
Walter et al.

(10) Patent No.: US 7,934,533 B2
(45) Date of Patent: May 3, 2011

(54) ROLLER BLIND WITH CENTERING BY STOPS

(75) Inventors: Herbert Walter, Ebersbach (DE); Werner Schlecht, Aurich (DE)

(73) Assignee: BOS GmbH & Co. KG, Ostfildern (DE)

( * ) Notice: Subject to any disclaimer, the term of this patent is extended or adjusted under 35 U.S.C. 154(b) by 417 days.

(21) Appl. No.: 11/708,848

(22) Filed: Feb. 21, 2007

(65) Prior Publication Data

US 2007/0195536 A1 Aug. 23, 2007

(30) Foreign Application Priority Data

Feb. 22, 2006 (DE) .......................... 10 2006 008 160

(51) Int. Cl.
  *B60J 1/20* (2006.01)
  *B60J 3/00* (2006.01)
  *B60J 11/00* (2006.01)
(52) U.S. Cl. ................................. 160/370.22; 296/97.8
(58) Field of Classification Search .................. 160/238, 160/265, 266, 268.1, 270, 274, 290.1, 370.22
  See application file for complete search history.

(56) References Cited

U.S. PATENT DOCUMENTS

| 1,395,475 | A | * | 11/1921 | Bried ............................. 160/41 |
| 5,201,810 | A |   | 4/1993  | Ojima et al. |
| 5,404,926 | A | * | 4/1995  | Ojima et al. .................. 160/280 |
| 5,560,668 | A | * | 10/1996 | Li .................................. 296/97.8 |
| 6,047,762 | A | * | 4/2000  | Anderson ................ 160/370.22 |
| 6,086,133 | A | * | 7/2000  | Alonso ......................... 296/97.8 |
| 7,125,064 | B1 | * | 10/2006 | Sien .............................. 296/37.8 |
| 2001/0017194 | A1 | * | 8/2001 | Schlecht et al. ......... 160/370.22 |
| 2006/0260770 | A1 | * | 11/2006 | Gradl ....................... 160/370.22 |

FOREIGN PATENT DOCUMENTS

| DE | 29921859 U1 | 8/2000 |
| DE | 100 57 760 A1 | 6/2002 |
| DE | 10 2004 020 531 B3 | 9/2005 |
| EP | 1 211 109 A1 | 6/2002 |

OTHER PUBLICATIONS

Definiton of the word "abut"; provided in attachment; www.thefreedictionary.com, Dictionary/Thesarus; 2010.*
Office Action issued Mar. 26, 2009 in German counterpart application, 102006008160.9.

* cited by examiner

*Primary Examiner* — Katherine Mitchell
*Assistant Examiner* — Jeremy C Ramsey
(74) *Attorney, Agent, or Firm* — Leydig, Voit & Mayer, Ltd.

(57) ABSTRACT

A window shade for motor vehicles having a shade of approximately trapezoidal shape. An extension profile or pull rod of the shade, the ends of which are guided in guide rails, is arranged on the shortest transverse edge of the shade. In order to compensate for a varying distance between the guide rails, the extension profile is divided into a center section, on which the shade is fixed, and two end sections that move in the guide rails. Centering devices are provided in order to prevent transverse creases in the shade when it is completely extended. The centering devices, which are effective when the shade is completely extended, act upon the center section.

9 Claims, 5 Drawing Sheets

ROLLER BLIND WITH CENTERING BY STOPS

FIELD OF THE INVENTION

The present invention relates generally to window shades for motor vehicles, and more particularly, to motor vehicle window shade assemblies that are automatically extendable and retractable.

BACKGROUND OF THE INVENTION

Due to its technical design, the rear window of a passenger car is not bordered by parallel edges. The width of the rear window glass or rear window decreases as it progresses upwardly toward the lower roof edge.

Guide rails integrated into the C-column of the car body recently have been utilized when the rear window is to be provided with a window shade. The spacing between these guide rails changes in accordance with the progression of the C-column. Consequently, it must be possible to telescopically adjust the length of a rear window shade pull rod or extension profile that is guided in the guide rails.

The extension profile of such a window shade, for example, according to DE 2004 020 531 B3 or DE 157 760 A1, is composed of a center section and two end sections. The end sections which are provided with sliding elements that slide in the guide rails, can be telescopically displaced relative to the center section.

One edge of the shade is fixed on the center section of the extension profile and the other edge is anchored on a winding shaft. The winding shaft is rigid and firmly supported in the region of the rear window shelf, or under the shelf within the car body, such that it can rotate.

In the retracted state, the end sections are completely extended out from the center section. The end sections slide into the center section when the window shade is extended up and the extension profile approaches the lower roof edge. The greatest relative movement between an end section and the center section occurs where the frictional force between the two components is the lowest. As a result, the center section may become shifted relative to the structural center of the window shade in the completely extended state such that unsightly transverse creases are formed in the shade. This can be prevented, according to the aforementioned publications, in that both end sections are coupled by means of a differential gear such that the center section inevitably remains centered between the end sections at all times. Such arrangement is effective, but relatively complicated.

OBJECTS AND SUMMARY OF THE INVENTION

It is an object of the present invention to provide a window shade assembly, particularly adapted for rear windows of automobiles, that has a pull rod or profile with a relatively simple arrangement for ensuring that a center section of the pull out profile is centered when the shade is completely extended.

In one embodiment of window shade assembly, the shade has a rotatable winding shaft that is supported in the vehicle. One edge of the shade is attached to the winding shaft and the opposite end is connected to an extension or pull out profile. The extension profile is composed of a center section and two end sections that can be displaced relative to the center section. The end sections respectively carry a sliding element at the end that projects from the center section. Each sliding element is guided in a guide groove of a corresponding guide rail. The two guide rails converge in the direction extending away from the winding shaft.

In order to ensure that the center section is properly centered in the extended state, and thus prevents any oblique tension in the shade, a centering device is provided on the center section of the extension profile and a complementary centering device is rigidly fixed on the car body. In the extended state of the shade, the two centering devices engage with one another and thus force the center section of the pull out profile into a defined position that corresponds to an unstressed condition of the shade.

Even if the center section is unevenly displaced relative to the two end sections during extension of the window shade such that the shade is pulled out obliquely, by the end of the extended movement of the pull out profile the oblique tension is eliminated due to a lateral displacement of the center section with the aid of the centering device. Moreover, even if transverse creases may be created under certain circumstances during the extension movement of the window shade, this state is a transient state of comparatively short duration, such that subsequently the transverse creases no longer appear objectionable.

According to one relatively simple embodiment, centering of the center section of the pull out profile in the extended position is effected with the aid of stopping faces and stopping elements. The stopping faces are situated to either side of the center section and cooperate with stops provided on the end sections. Since the end sections are always situated in the same defined upper position due to the sliding elements that are guided in the guide rails, their position can be utilized with the aid of the stops for forcing the center section into the centered position in which the shade is not subjected to the oblique tension that would otherwise be caused by a non-centered center section. In other respects, the design of this window shade corresponds to that of the previously described embodiment.

According to a third variation, the center section has stops that are designed to cooperate with the guide rails. In the extended state, they contact the guide rails and accordingly force the center section into the required centered position.

In the first variation, the centering device may be a projection seated on the center section, which may have the shape of a rib. In order to prevent the rib from projecting beyond the outside contour, it may be sunk in the center section. Alternatively, a rib can also be arranged in a stationary fashion, and conversely the center section can merely have a complementary depression.

Depending on the installation conditions in the motor vehicle, the projections can either laterally project from or be laterally arranged on the center section if a slot is provided. In this case, the projections or depressions ultimately face transverse to the moving direction of the window shade during its retraction and extension. Alternatively, it may also be advantageous for the projections or depressions to face in the moving direction.

In the second embodiment with stops on the end sections, it is advantageous for the stops on the end sections or the faces of the center section cooperating therewith to be adjustable. This makes it possible to compensate for car body and installation tolerances with respect to spacing, as well as to offset of the center between the guide rails.

Other objects and advantages of the invention will become apparent upon reading the following detailed description and upon reference to the drawings, in which:

Figure 1:
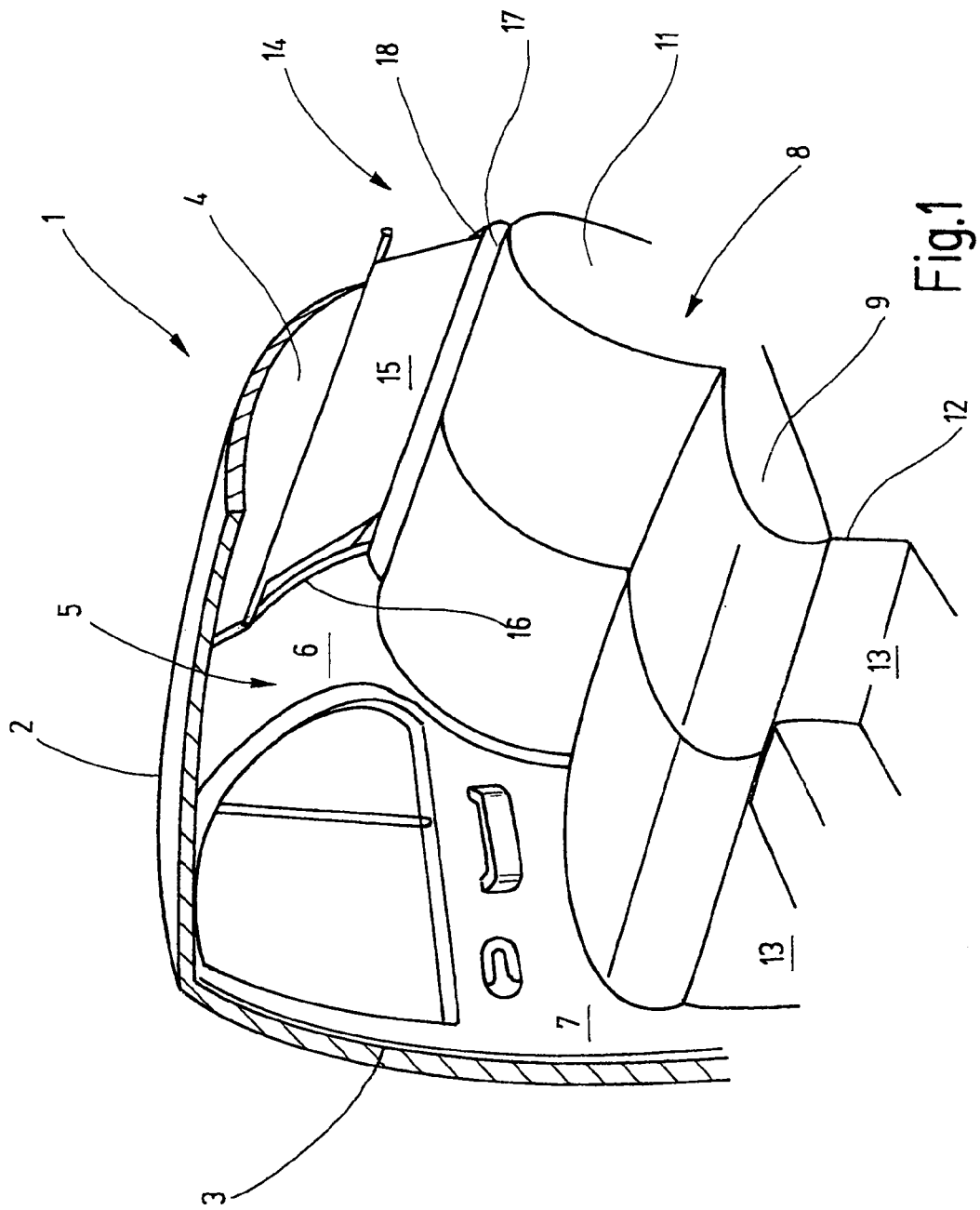
FIG. 1 is a broken open perspective of a rear area of a motor vehicle having a window shade assembly in accordance with the invention.

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention.

DETAILED DESCRIPTION OF THE INVENTION

Referring now more particularly to FIG. 1 of the drawings, there is shown an illustrative motor vehicle having a car body section 1 with a rear window shade assembly in accordance with the invention. FIG. 1 represents a cut-away rear area of a passenger car. The figure illustrates a view towards the right side interior, which is the mirror image of the left side interior. The illustrated car body section 1 has a roof 2 from which a B-columns 3 (only one of which is shown) extend downwardly on opposite lateral sides of the car to an undercarriage in a known manner. The roof 2 transitions into a rear window 4 at its rear edge. The rear window 4 ends laterally between C-columns 5 which are rearwardly spaced from the B-columns 3 and carry an interior lining 6. The width of the rear window 4 is smaller in the vicinity of its upper edge than at the lower height edge.

Between the B-column 3 and the C-columns 5, rear doors 7 are hinged to the B-columns in a conventional manner. A rear bench seat 8 with a seating surface 9, as well as a rear backrest 11, are arranged at the level of the right rear door 7. The rear seating surface 9 rests on a pedestal 12 that forms part of the undercarriage and in which footwells 13 are formed in front of the rear seating surface 9.

A rear window shade assembly 14 is provided in front of the rear window 4 on the inner side, which includes a sunshade 15 shown in a partially extended condition in FIG. 1. The sunshade 14 is supported for movement in laterally opposed guide rails 16. The guide rails 16 begins at a rear window shelf 17 that is situated behind the rear backrest 11 and extend laterally adjacent to the edges of the window. The guide rails 16 preferably are made of plastic and are integrated into the interior lining of the C-column 5. The rear window shelf 17 has an extension slot through which the sunshade 15 can be pulled out.

Figure 2:
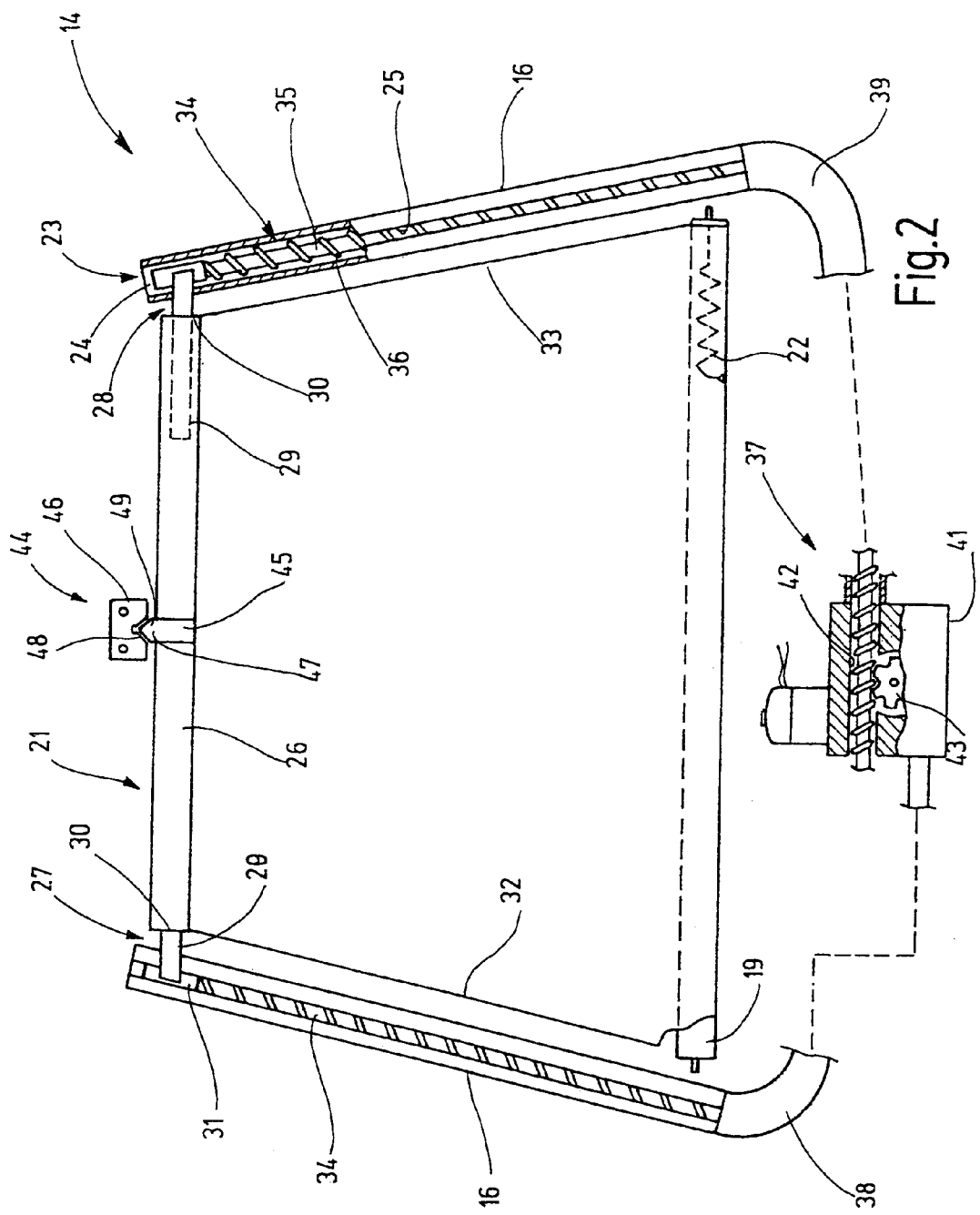
FIG. 2 is a diagrammatic depiction of the window shade assembly when the window shade is in an extended position engaging a centering device for the window shade.

The basic design of the rear window shade assembly 14 is shown in FIG. 2. In addition to the actual sunshade 15, the rear window shade assembly 14 comprises a winding shaft 19 that is rotatably supported underneath the extension slot 18 and rear window shelf 17, respectively, as well as a pull out rod or profile 21. The sunshade 15 in this case has a trapezoidal shape that approximately corresponds to the window geometry and consequently is narrower on the upper end than at the lower end that is connected to the winding shaft 19.

One edge of the sunshade 15 is fixed on the winding shaft 19. The winding shaft 19 is biased in the direction in which the sunshade 15 is wound up on the winding shaft 19 with the aid of a coil spring 22 that serves as a spring drive. To this end, the coil spring 22 is attached to the inner side of the winding shaft 19 at one end and anchored in a non-rotatable fashion to the car body at the other end, as is schematically indicated in FIG. 2.

Opposite ends of the extension rod or profile 21 are guided in the two guide rails 16. These guide rails are arranged behind the side lining 6 of the C-column 5 and extend approximately along the contour of the rear window 4 such that they converge in the direction of their upper ends. For reasons of simplicity, the guide rails are illustrated as straight in FIG. 2. The guide rails 16 begin underneath the rear window shelf 17 and end in the vicinity of the upper edge of the rear window 4. The two guide rails 16 have the same design. It therefore suffices to describe their design in greater detail with reference to only one of the guide rails 16.

The guide rail 16 contains a guide groove 23, the cross section of which consists of a groove chamber 24 and a groove slot 25. The groove slot 25 has a smaller width than does the groove chamber 24, which is circular in cross section. The groove slot 25 opens in the direction of the rear window 5 and consequently in the direction of the viewer of the schematic representation.

The extension rod or profile 21 is comprised of a rigid center section 26 of invariable length and two end sections 27, 28 that can be displaced telescopically relative to the center section 26. The two end sections 27, 28 are also in the form of mirror images so that it suffices to describe only one of the two end sections in greater detail. The description applies analogously to the other of the two end sections 27, 28, wherein the same reference numerals are used for identifying the structures arranged at that location.

The end section 27 comprises a rod 29 with a flat rectangular cross section that is guided in an appropriate receptacle channel within the center section 26 such that it can be longitudinally displaced, but not rotated, wherein said rod 29 projects from an end face 30 of the center section 26. In order to symbolize the arrangement of the rod 29 in the center section, the rod 29 is illustrated with broken lines within the center section 26 on the right side as shown in FIG. 2. At the free end that projects from the center section 26, the rod 29 is angled downwardly relative to the plane of projection in the direction of the slot 25 and extends into the guide groove 23 through the slot 25. A sliding element 31 is fixed on the rod 29 within the guide groove 23 and has a shape that corresponds to the cross section of the groove chamber 24. The thickness of the rod 29 is chosen such that it can extend through the guide slot 25 without jamming.

The sunshade 15, as indicated above, has a trapezoidal shape and is bordered by two lateral edges 32, 33 that extend approximately parallel to the two guide rails 16 when the shade is extended. The lower end of the sunshade 15 is conventionally fixed on the winding shaft 19, for example, with a piping that is fixed in a corresponding groove, with the upper edge being anchored to the center section 26. The connection between the center section 26 and the sunshade 15 is generally known and does not require a detailed description because it is not the object of the invention. It is merely important to note that the width of the sunshade 15 corresponds to the length of the center section 26 at the location at which it is connected thereto. The length of the center section 26, i.e., the distance between the end faces 30, is once again slightly shorter than the distance between the guide rails 16 at the location at which the extension profile or rod 21 is situated when the sunshade 15 is completely extended, as shown in the figure.

In order to position the sunshade 15 in front of the rear window 4, a respective elastically bendable linear thrust element 34 is guided in a buckle resistant fashion in each of the two groove chambers 24. Each thrust element 34 is composed of a core 35 of circular cross section with a helix 36 extending on the outer side of the core 35. The helix 36 is rigidly connected to the core 35 and forms what amounts to a circumferentially extending gear on the outer side of the core 35. In this respect, the linear thrust element 34 can be interpreted as an elastically bendable, circumferentially geared rack. The thrust element 34 has a free end that abuts the adjacent end face of the sliding element 31.

The two thrust elements 34 are moved by a common gear motor 37. Guide tubes 38, 39 respectively extend to the gear motor 37 from the lower ends of each guide rails 16. The gear motor comprises a gear housing 41 through which two bores 42 extend parallel to one another, only one of which is visible in FIG. 2. The bores 42 extend tangentially past a gear 43 that is seated on an output shaft of the gear motor 37 in a torsionally rigid fashion. The gear 43 has teeth that match the pitch of the helix 36 arranged on the core 35. A positive connection thereby is produced between the gear 43 and each of the two thrust elements 34.

Since the two thrust elements 34 mesh with the gear 43 on diametrically opposite sides, they are respectively displaced by the same distance in opposite directions during rotation of the gear 43. The parts of the respective thrust elements 34 that project beyond the gear 43 from the point of view of the respective guide tube 38, 39 can be accommodated in appropriate storage tubes.

The arrangement described above functions as follows:

When the window shade 14 is completely retracted, the pull rod or profile 21 lies on and covers the extension slot 18 in the rear window shelf 17 over at least the length of the center section 26. In the retracted position, the extension profile 21 is situated as close as possible to the winding shaft 19 and therefore in a region in which the two guide rails 16 are spaced apart from one another by the greatest distance. Since the center section 26 has a constant length, the distance between the two guide rails 16 is compensated by extension of the end sections 27, 28. However, they still have ends displaceably accommodated in the center section 26.

The gear motor 37 is actuated when the sunshade 15 needs to be extended in front of the rear window 4 from this retracted position. The gear motor 37 displaces both thrust elements 34 into the guide rails 16 in opposite directions, but by the same distance. The extension rod or profile 21 is moved in the direction toward the upper edge of the rear window 4 and therefore in the direction of the upper ends of both guide rails 16 against the effect of the spring drive 22 that constantly attempts to wind up the sunshade 15 on the winding shaft 19. The gear motor 37 is able to generate a force that is greater than the retraction force exerted by the spring drive 22.

During the shade extension movement, the distance between the two guide rails 16 is reduced with respect to the extension rod or profile 21. This causes both end sections 28, 29 with the guide rods 29 to be pushed deeper and deeper into the center section 26. The two end sections 27, 28 are pushed into the center section as far as possible when the extension rod 21 has reached the upper end position in front of rear window 4.

The sunshade 15 itself is limp and therefore unable to exert forces on center section 26 other than tensile forces acting perpendicular to the longitudinal extent of the center section 26. The sunshade 15, in particular, is unable to displace the center section 26 relative to the two end sections 27, 28 parallel to its longitudinal extent.

It is possible and actually expected that the frictional forces between the guide rods 29 of the two end sections 27, 28 and the center section 26 are not exactly identical. In such instances, the two end sections 27, 28 are pushed into the center section 26 to different depths. This means that the center section 26 is no longer in its nominal position relative to the winding shaft 19, but rather is shifted to the right or left side relative to the plane of projection. This shift leads to oblique tensions in the sunshade 15 and therefore to quite unsightly transverse creases.

In accordance with the invention, the window shade 14 is provided with a centering device 44 for preventing such distortion. The illustrated centering device 44 comprises a first centering means 45 and a second centering means 46. The first centering means 45 in the embodiment shown consists of an arm with a point 47 that projects beyond the extension rod or profile 21. The second centering means 46 is stationarily arranged in the vehicle adjacent to the upper edge of the rear window 4. The second centering means 46 features a bifurcation or recess 48 that opens in the direction of the center section 26. The point 47 and the bifurcation 48 are complementary to one another. The width of the bifurcation 48 is wider than the greatest expected longitudinal offset of the center section 26 between the two guide rails 16.

If the aforementioned lateral offset of the center section 26 relative to the winding shaft 19 occurs during extension of the sunshade 15, the point 47 of the first centering means 45 penetrates into the bifurcation 48 of the second centering means 46 at the end of the extension movement. Since the point 47 has oblique flanks 49 that form an angle, for example, of 90°, the point 47 is automatically centered in the complementary bifurcation 48 and the center section 26 is correspondingly shifted parallel to its longitudinal extent. The position of the first centering means 45 relative to the position of the stationary second centering means 46 is chosen such that at the end of the extension movement the center section 26 is situated in a position between the guide rails 16 that causes no oblique tension in the sunshade 15. It will be understood that even if transverse creases should be created in the sunshade 15 during the extension movement, creases are eliminated at the end of the extension movement because the centering device 44 forces the center section 26 of the extension profile 21 into the correct position.

While the two centering means 45, 46 are schematically depicted in FIG. 2, the centering means may be designed in an aesthetically reasonable fashion such that they remain as inconspicuous as possible. It will be understood that while the desired centering can be achieved if the point 49 is directed parallel to the extension movement of the sunshade 15 as shown, alternatively, the desired centering also is possible if the point is directed perpendicular to the plane of projection and therefore perpendicular to the movement direction. It also will be appreciated that the desired centering can be achieved if the point 49 is stationary and the bifurcation 48 is in the form of a corresponding opening or recess in the center section 26.

Figure 3:
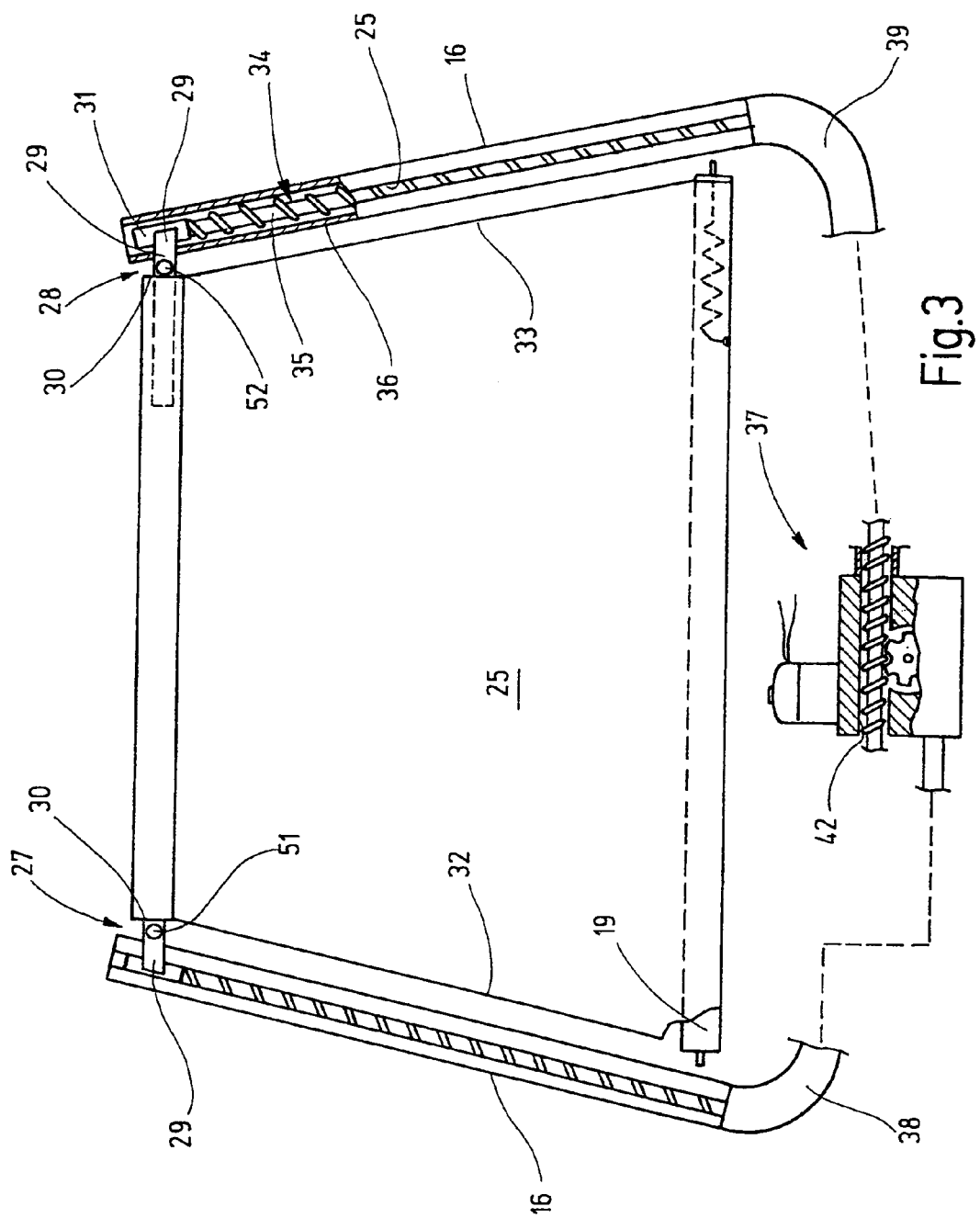
FIG. 3 is a diagrammatic depiction of a window shade assembly with an alternative embodiment of centering device.

Adjustments can be easily carried out if the position of the point 47, i.e., the position of the first centering means 45 along the center section 26, or the position of the stationary centering means 46 can be adjusted or calibrated with suitable structural measures, as will be understood by a person skilled in the art. The desired centering is achieved in the embodiment according to FIG. 2 with the aid of a stationary centering means. FIG. 3 shows an embodiment in which the center section 26 is centered exclusively with elements provided on the extension profile 21.

In other respects, the embodiment shown in FIG. 3 corresponds to the design of the window shade 14 according to FIG. 2, with the reference symbols used in FIG. 2 being repeated in FIG. 3 for similar elements. Instead of utilizing two centering means 45, 46, the embodiment according to FIG. 3 utilizes two stops 51, 52 that are provided on the rods 29 of the two end sections 27, 28 of the pull rod or profile. The stops 51, 52 are arranged on a flat side of each rod 29 and project in the form of short cylindrical pins or buttons. The spacing and the positions of the two stops 51, 52 relative to one another are chosen such that the center section 26 is sufficiently centered between these stops when the window shade 14 is extended, i.e., the residual centering error does not suffice to create transverse creases in the sunshade 15 regardless which of the two stops 51, 52 the center section 26 abuts with its end face 30.

If the stops 51, 52 are stationary on the end sections and cannot be adjusted, tolerances with respect to the position of the guide rails 16 might still lead to an oblique distortion. However, it is possible to provide stops 51, 52 that cooperate with the end faces 30 of the center section 26 in a selectively adjustable fashion in accordance with the embodiment of FIG. 4. In this case, the stops 51, 52 against which the center section abuts consist of cylindrical cams. A shaft 55 originating from one end face is designed to be inserted into a corresponding bore 56 in the guide rod 29. After insertion of the cylindrical pin 55, it is riveted on the opposite side such that a closing and retaining head is formed. The riveting creates a sufficient frictional engagement for preventing an independent relative rotation of the cylindrical head 51, 52, while still making it possible to rotate the head with the aid of a tool.

Figure 4:
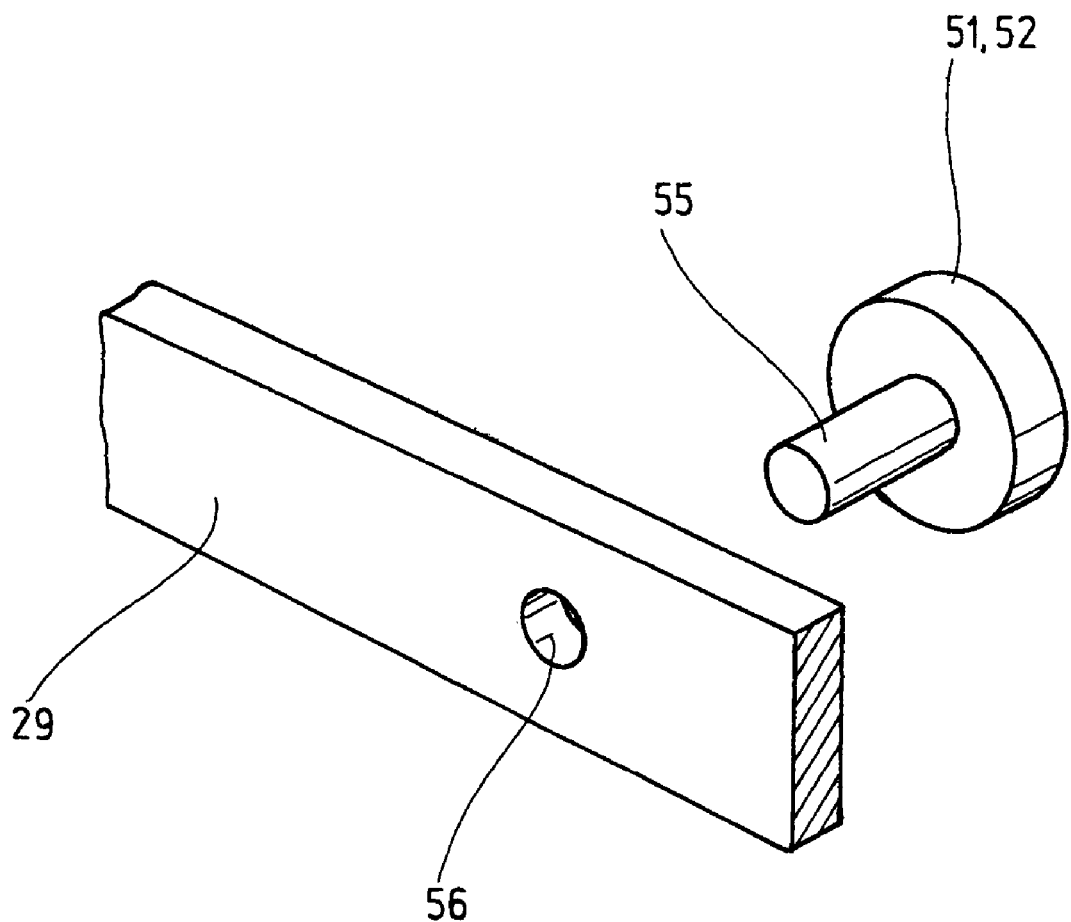
FIG. 4 is an enlarged perspective of cams utilized in the centering device according to the embodiment of FIG. 3.

The handling and adjustment of the embodiment according to FIG. 4 are described below: During the course of installation, the sunshade 15 is moved into the extended position. The distance between the stops 51, 52 is adjusted and the position of the center section 26 relative to the end sections 27, 28 is adjusted until no more transverse creases can be observed, namely by rotating the two stops 51, 52 that are eccentric relative to the pin 55. Since the stops 51, 52 are riveted in an appropriately rigid fashion, it is not possible to effect subsequent displacements during the operation of the window shade 14.

Figure 5:
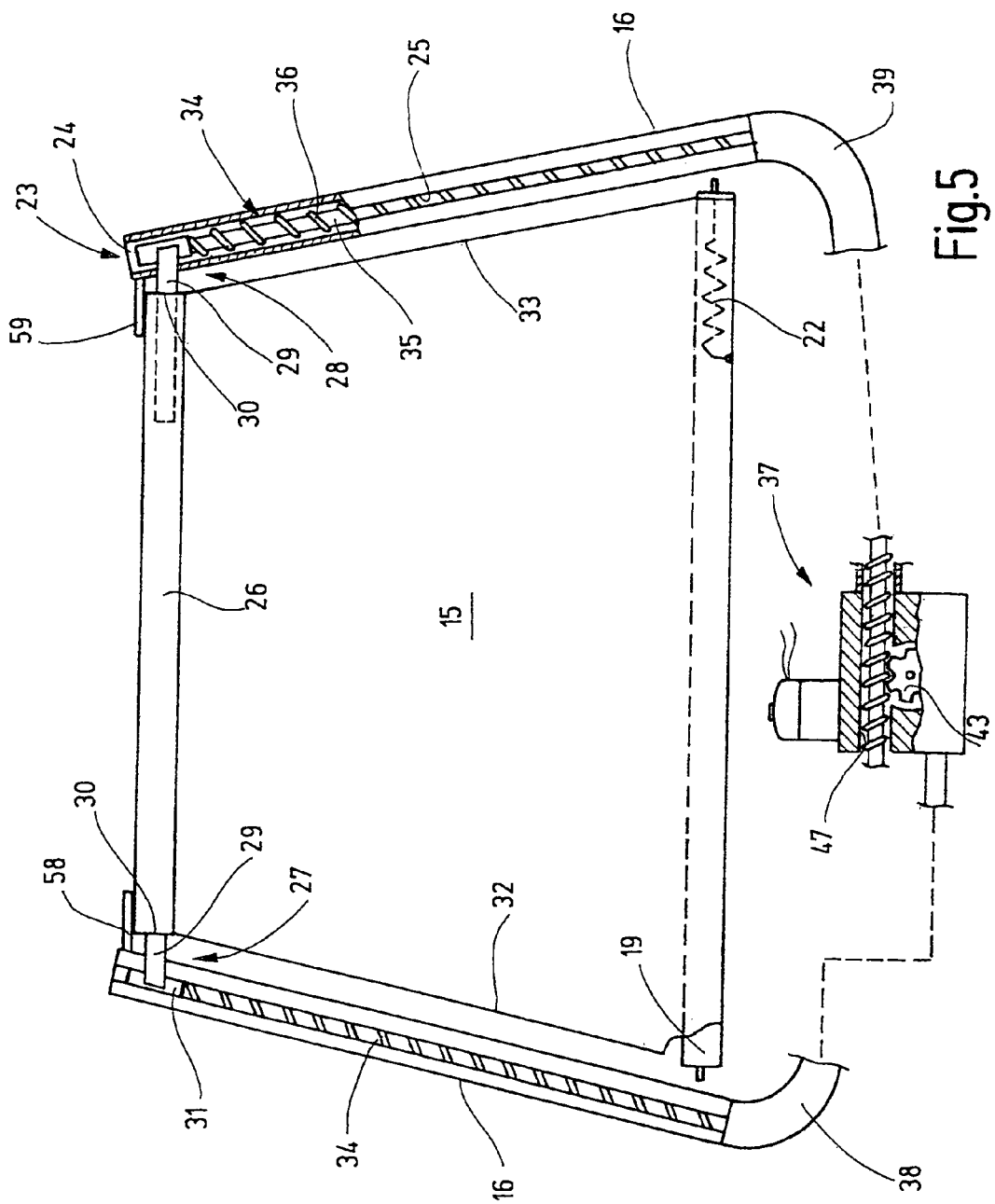
FIG. 5 is a diagrammatic depiction of a window shade assembly with still a further alternative embodiment of centering device.

In the embodiment according to FIG. 5, stopping elements 58, 59 are provided on the center section 26, with said stopping elements projecting beyond the end faces 30 and cooperating with the adjacent guide rails 16. In the extended position, the stopping elements 58, 59 come into contact with the respective guide rail 16, depending on the position of the center section 26, such that the center section 26 is displaced until the desired centered position is reached in which no transverse creases are created in the sunshade 15. The two stopping elements 58, 59 may be adjustably mounted on the center section 26 in order to effect a subsequent adjustment for compensating a positional tolerance of the guide rails 16.

The invention has been described in detail above in connection with a rear window shade. It will be understood, however, that the centering principle is not limited to window shades on rear windows. On the contrary, the disclosed principle for centering the center section 26 of an extension pull rod or profile of variable length also is suitable for roof window shades or side window shades in motor vehicles, with the basic design of such window shades being substantially identical to that described above.

From the foregoing, a window shade for motor vehicles is provided that has a shade of approximately trapezoidal shape. An extension profile or pull rod, the ends of which are guided in guide rails, is arranged at the shortest transverse edge. The distance between the guide rails varies. In order to compensate for this varying distance, the extension profile is divided into a center section, on which the shade is fixed, and two end sections that move in the guide rails. Centering devices are provided in order to prevent transverse creases in the shade when it is completely extended. The centering devices, which are effective when the shade is completely extended, act upon the center section to effect the necessary centering.

The invention claimed is:

1. A window shade assembly (14) for regulating the light admitted into the interior of a motor vehicle through a window (4) comprising:
    a rotatably supported winding shaft (19),
    a sunshade (15) having one edge fixed to the winding shaft (19),
    a pair of guide rails (16) extending laterally adjacent to the sunshade (15) for guiding movement of the sunshade between a retracted position and a completely extended position,
    an extension profile (21) of variable length that is connected to an edge of the sunshade (15) opposite the winding shaft (19) for movement with the sunshade between said retracted and completely extended positions, said extension profile (21) including a center section (26) and two telescopic sections (27, 28) that are displaceably supported on the center section (26), said telescopic sections (27, 28) having ends which are guided in the guide rails (16),
    a drive (41,25) that cooperates with said telescopic sections (27,28) for automatically moving said extension profile (21) and sunshade (15) to said extended position,
    a first centering device (46) fixed on a body of the motor vehicle at a location at which the extension profile (21) is positioned when the sunshade (15) is completely extended, and
    a second centering device (45) on the center section (26) of the extension profile (21), one of said centering devices (45) including a projection (48) directed toward the other of said centering devices (46), and said other centering device (46) including a recess opening in a direction toward the projection of the one centering device (45) for receiving and centering the projection (48) of the one centering device (45) as an incident to straight movement of the projection (48) of the one centering device (45) into the recess during automatic movement of said sunshade (15) by said drive (41,25) to said extended position for causing centering movement of the center section (26) of the extension profile (21) between the guide rails (16) without manual manipulation of said extension profile (21).

2. The window shade assembly of claim 1, in which said projection (48) is in the form of a rib.

3. The window shade assembly of claim 1, in which said projection (48) projects in a direction that extends parallel to the movement of the sunshade (15) during its extension.

4. The window shade assembly of claim 1, in which said first centering device (44) includes a depression on the center section (26).

5. A window shade assembly (14) for regulating the light admitted into the interior of a motor vehicle through a window (4) comprising:
    a rotatably supported winding shaft (19),
    a sunshade (15) having one edge fixed to the winding shaft, a pair of guide rails (16) extending laterally adjacent the sunshade (15) for guiding movement of the sunshade between a retracted position and a completely extended position, an extension profile (21) of variable length connected to an edge of the sunshade (15) opposite the winding shaft (19) for movement with the sunshade between said retracted and completely extended positions, said extension profile (21) including a center section (26) and two telescopic sections (27, 28) displaceably supported on the center section (26), said telescopic sections (27, 28) having ends which are guided in the guide rails (16), said center section (26) having first and second stopping faces (30) at opposite outermost ends on said center section (26), and a first stop (51) and a second stop (52) each arranged on a respective one said telescopic sections (27, 28), said stops (51, 52) being located on said telescopic sections (27,28) so that when the extension profile (21) is in said completely extended position the distance between said stops corresponds to the length of said center section (26) such that as an incident to movement of said extension profile (21) and said sunshade (15) to said completely extended position said stopping surfaces at the opposite outermost ends of said center section (26) physically engages said first and second stops (51, 52) for substantially centering the center section between the guide rails (16) when the sunshade (15) is in the completely extended position.

6. The window shade assembly of claim 5, in which at least one of the stops (51, 52) is in the form of a cam element eccentrically mounted on one of said telescopic sections for permitting selected adjustment of the distance between said first and second stops (51, 52) when said extension profile (21) and sunshade (15) and in said completely extended position.

7. The window shade assembly of claim 5, including adjustably complementary stops provided on the center section (26).

8. The window shade assembly of claim 1 in which said second centering device (45) includes said projection, and said recess is on said first centering device.

9. The window shade assembly of claim 1 in which said recess and an outer end of said projection have complementary configurations.

* * * * *